US008464618B2

(12) United States Patent
Kanaya et al.

(10) Patent No.: US 8,464,618 B2
(45) Date of Patent: Jun. 18, 2013

(54) NUMERICALLY CONTROLLED LATHE WITH GUIDE BUSH, AND METHOD OF PROCESSING WORKPIECE BY USING THE NUMERICALLY CONTROLLED LATHE

(75) Inventors: Akihide Kanaya, Kitasaku-gun (JP); Noriyuki Haseba, Kawaguchi (JP)

(73) Assignee: Citizen Holdings Co., Ltd., Tokyo (JP)

( * ) Notice: Subject to any disclaimer, the term of this patent is extended or adjusted under 35 U.S.C. 154(b) by 879 days.

(21) Appl. No.: 12/450,110

(22) PCT Filed: Mar. 26, 2008

(86) PCT No.: PCT/JP2008/055646
§ 371 (c)(1),
(2), (4) Date: Sep. 11, 2009

(87) PCT Pub. No.: WO2008/117812
PCT Pub. Date: Oct. 2, 2008

(65) Prior Publication Data
US 2010/0083800 A1    Apr. 8, 2010

(30) Foreign Application Priority Data
Mar. 28, 2007  (JP) .................................. 2007-085571

(51) Int. Cl.
*B23B 3/16*    (2006.01)
*B23Q 3/18*    (2006.01)

(52) U.S. Cl.
USPC ................... 82/1.11; 82/117; 82/162; 82/164

(58) Field of Classification Search
CPC ......................................... B23B 25/00
USPC ..................... 82/1.11, 150, 164, 162, 117
See application file for complete search history.

(56) References Cited

U.S. PATENT DOCUMENTS

| 2,842,998 | A | * | 7/1958 | Kostka | 82/164 |
| 3,225,631 | A | * | 12/1965 | Hermann | 82/164 |
| 4,180,894 | A | * | 1/1980 | Link | 29/36 |
| 4,964,320 | A | * | 10/1990 | Lee, Jr. | 82/1.11 |
| 5,014,580 | A | * | 5/1991 | Porter | 82/164 |
| 5,222,421 | A | * | 6/1993 | Ushiro | 82/164 |
| 5,277,090 | A | * | 1/1994 | Shintani et al. | 82/112 |
| 7,448,120 | B2 | * | 11/2008 | Ohmori et al. | 29/27 C |
| 7,509,898 | B2 | * | 3/2009 | Tanaka et al. | 82/164 |

FOREIGN PATENT DOCUMENTS

| JP | S58-192701 | 11/1983 |
| JP | S62-199303 | 9/1987 |
| JP | S63-251101 | 10/1988 |
| JP | H07-328802 | 12/1995 |

(Continued)

*Primary Examiner* — Will Fridie, Jr.
(74) *Attorney, Agent, or Firm* — Manabu Kanesaka

(57) ABSTRACT

Disclosed is a numerically controlled lathe 100 which includes a head stock 110 which rotatably supports a spindle 120; a guide bush 170 disposed so as to face the head stock 110 and configured to support one end of a bar-like workpiece W extending from the spindle 120; and a tool post 130 having a tool T1 to process the workpiece W supported by the spindle 120 and the guide bush 170, the guide bush 170 being movable in the same direction as a spindle axis C, the lathe further including a first processing region A which is provided between the guide bush 170 and the spindle 120 and in which the workpiece W is processed by the tool T1 attached to the tool post 130.

9 Claims, 7 Drawing Sheets

FOREIGN PATENT DOCUMENTS

| | | |
|---|---|---|
| JP | H11-320212 | 11/1999 |
| JP | 2000-117506 | 4/2000 |
| JP | 2001-205501 | 7/2001 |
| JP | 2003-25101 | 1/2003 |
| JP | 2004-025403 | 1/2004 |
| JP | 2007-210082 | 8/2007 |

* cited by examiner

NUMERICALLY CONTROLLED LATHE WITH GUIDE BUSH, AND METHOD OF PROCESSING WORKPIECE BY USING THE NUMERICALLY CONTROLLED LATHE

TECHNICAL FIELD

The present invention relates to a numerically controlled lathe including a guide bush which faces a spindle to support an end of a workpiece and being capable of processing the workpiece on both sides of the guide bush while the workpiece is supported by this guide bush, and it also relates to a method of processing the workpiece by use of this numerically controlled lathe.

BACKGROUND ART

A numerically controlled lathe (hereinafter referred to as the NC lathe) including a guide bush is known, and the guide bush is configured to rotatably support a workpiece in the vicinity of a processing position where the workpiece is processed by a tool attached to a tool post. The guide bush supports the workpiece which is being processed in the vicinity of the processing position to suppress swing and deflection generated in a processing target portion owing to rotation, whereby the workpiece can be processed with high accuracy.

FIG. 8 is a plan view showing a conventional example of the NC lathe provided with the guide bush.

On a bed 201 of an NC lathe 200A, a head stock 210 which roatably supports a spindle 220 is provided. The head stock 210 can move forwards and backwards in a Z-axis direction which is the same direction as that of a spindle axis C extending through the center of the rotation of the spindle 220. The rotation center of the spindle 220 is provided with a through hole (not shown). Into this through hole, A long-bar-like workpiece W is inserted. The workpiece W is grasped by a chuck (not shown) provided at the tip of the spindle 220.

On both sides of the spindle axis C, a first tool post 230 and a second tool post 250 are disposed so as to face each other.

On one side (the downside in FIG. 8) of the head stock 210, a guide rail 231 is disposed on the bed 201 in a Z1-axis direction parallel to a Z-axis, and on this rail, a tool post main body 233 of the first tool post 230 is mounted. The tool post main body 233 can move forwards and backwards in the Z1-axis direction while being guided along the guide rail 231, by driving of a driving member (not shown). The front surface (on the left side in FIG. 8) of the tool post main body 233 is provided with a guide rail 235 in an X1-axis direction crossing the Z-axis at right angles, and on this rail, a slider 241 having a tool attaching portion 240 is mounted. The slider 241 can move forwards and backwards in the X1-axis direction while being guided along the guide rail 235, by driving of a driving member (not shown). To the tool attaching portion 240, a plurality of comb-teeth-like tools T1 are attached via a holder 242 in a direction crossing the X1-axis and the Z1-axis at right angles. The holder 242 is movable in an axial direction (hereinafter referred to as the Y1-axis) crossing the X1-axis and the Z1-axis at right angles, and by a combination of the movement of the tool post main body 233 in the Z1-axis direction, the movement of the slider 241 in the X1-axis direction and the movement of the holder 242 in the Y1-axis direction, the tool T1 is indexed and positioned with respect to the workpiece W.

On the other side (the upside in FIG. 8) of the head stock 210, a guide rail 251 is disposed on the bed 201 in a Z2-axis direction parallel to the Z-axis, and on this rail, a tool post main body 253 of the second tool post 250 is mounted. The tool post main body 253 can move forwards and backwards in the Z2-axis direction while being guided along the guide rail 251, by driving of a driving member (not shown). The front surface (on the left side in FIG. 8) of the tool post main body 253 is provided with a guide rail 255 in an X2-axis direction crossing the Z-axis at right angles, and on this rail, a slider 261 having a tool attaching portion 260 is mounted. The slider 261 can move forwards and backwards in the X2-axis direction while being guided along the guide rail 255, by driving of a driving member (not shown). To the tool attaching portion 260, a plurality of comb-teeth-like tools. T2 are attached via a holder 262 in a direction crossing the X2-axis and the Z2-axis at right angles. The holder 262 is movable in an axial direction (hereinafter referred to as the Y2-axis) crossing the X2-axis and the Z2-axis at right angles, and by a combination of the movement of the tool post main body 253 in the Z2-axis direction, the movement of the slider 261 in the X2-axis direction and the movement of the holder 262 in the Y2-axis direction, the tool T2 is indexed and positioned with respect to the workpiece W.

In front of the head stock 210, a guide bush 270 is provided between the first tool post 230 and the second tool post 250. This guide bush 270 is disposed so as to support the workpiece W along the spindle axis C, and fixed onto the bed 201. The guide bush 270 includes such a stational type that the inner peripheral surface of a guide hole into which the workpiece W is inserted is constituted as a plain bearing surface with respect to the rotating workpiece W, and such a rotary type that the inner peripheral surface of the guide hole rotates together with the workpiece W while substantially coming in contact with the outer peripheral surface of the workpiece W. As the guide bush 270, either the above-mentioned stational or rotary type may be selected as long as the workpiece W can move in the direction of the spindle axis C.

To process the workpiece W by the NC lathe 200 having the above constitution, the workpiece W is grasped by the chuck provided at the tip of the spindle 220, and in this state, the head stock 210 is moved toward the guide bush 270 so that one end of the workpiece W is protruded as much as a predetermined length from an outlet 271 of the guide bush 270.

Moreover, the spindle 220 is moved in the Z-axis direction while being rotated, and the spindle 220 is moved in the Z-axis direction to forward the workpiece W from the guide bush 270 to a processing position. Thus, the processing given to one product can proceed, and the relative movements of the tools T1, T2 and the workpiece W in the Z-axis direction can be caused. Then, a large number of products can continuously be formed from one long workpiece W.

According to the NC lathe 200 including the guide bush 270, the workpiece W is processed in the vicinity of the guide bush 270 which supports the workpiece W, and hence there are advantages that the influences of the deflection of the workpiece W itself and deflection generated by the abutment of the tools T1, T2 on the workpiece W can be decreased and that the workpiece W can be processed with high accuracy.

However, when the processing dimension (a length to be processed in the Z-axis direction) of the workpiece W by the tools T1, T2 increases, the length of the workpiece W to be protruded from the guide bush 270 also increases. In consequence, the deflection of the workpiece W and swing generated during the rotation of the spindle 220 increase, with the result that the processing accuracy of the workpiece W deteriorates.

To solve the above problem, in an automatic lathe disclosed in Patent Document 1 by the present applicant, an auxiliary guide is provided. This auxiliary guide can move between a processing position where an extending portion of the workpiece forwarded from the guide bush is processed and a standby position which is distant from this processing position. When the auxiliary guide is at the processing position, the extending portion of the workpiece can be supported. This auxiliary guide is provided so as to face the guide bush. When the workpiece is supported by the guide bush and the auxiliary guide, it is possible to suppress the influences of the deflection of the workpiece, the swing generated during the rotation of the spindle and the like, whereby a hole can correctly be made in the workpiece along the rotation axis thereof by use of a hole making tool such as a drill.

DISCLOSURE OF THE INVENTION

However, in the above-mentioned automatic lathe, an additional support device such as an auxiliary guide is required. In addition, a driving member or control means for moving the auxiliary guide in a Z-axis direction is necessary, and hence the constitution of an NC lathe becomes complicated.

Moreover, both ends of a workpiece are supported by a guide bush and the auxiliary guide. Therefore, the region of the workpiece which can be processed by one tool narrows, and accordingly the processing time of the workpiece lengthens.

The present invention has been developed in view of the above situations, and an object thereof is to provide a numerically controlled lathe including a guide bush and a method of processing a workpiece by use of this numerically controlled lathe. In the above lathe, it is possible to enlarge a region capable of processing the workpiece by a simple constitution without requiring another support device such as an auxiliary guide, and the processing time of the workpiece can be shortened, whereby the workpiece can be processed with high accuracy.

Patent Document 1: Japanese Patent Application Laid-Open No. 11-320212

Means for Solving the Problem

To solve the above problem, a numerically controlled lathe having a guide bush includes a head stock which rotatably supports a spindle; a guide bush disposed so as to face this head stock and configured to support one end of a bar-like workpiece extending from the spindle; and a tool post having a tool to process the workpiece supported by the spindle and the guide bush, the guide bush being movable in the same direction as a spindle axis, the above lathe further including a first processing region which is provided between this guide bush and the spindle and in which the workpiece is processed by the tool attached to the tool post.

According to this constitution, both the ends of the workpiece are supported by the spindle and the guide bush, and the processing of the workpiece can be accomplished in a state where the deflection of the workpiece is minimized. Hence, any additional device such as an auxiliary guide is not necessary, in addition to the guide bush. Furthermore, the region where the workpiece can be processed can be expanded to shorten a processing time, and the accurate processing of the bar-like workpiece can be achieved by the NC lathe having a simple constitution.

The invention has a constitution wherein a second processing region is provided in a region of the guide bush on a side opposite to the head stock, and a tool to process the workpiece protruding from the guide bush to the second processing region is attached to the tool post.

According to this constitution, the workpiece can be processed not only in the first processing region between the spindle and the guide bush and but also in the second processing region of the portion protruding from the guide bush.

The invention has a constitution wherein a first tool post and a second tool post are provided on both sides of the spindle axis, and at least one of the tool posts is movable in the same direction as the spindle axis.

In this case, as it is preferred that the tool of the first tool post processes the workpiece in the first processing region, and the tool of the second tool post processes the workpiece in the second processing region.

According to the above constitution, the processing of the workpiece can simultaneously be carried out in the first processing region and the second processing region.

The invention has a constitution wherein the guide bush is attached to the tool post which moves in the same direction as the spindle axis.

According to this constitution, an independent driving/control mechanism for moving the guide bush in the spindle axis direction and stopping it at a predetermined position becomes unnecessary, and hence the constitution of the NC lathe can be simplified.

The invention has a constitution wherein the head stock is fixed to a bed of the numerically controlled lathe, and a positioning tool is attached to one of the tool posts, the positioning tool being configured to abut on the workpiece extending from the guide bush to position the workpiece in the direction of the spindle axis of the workpiece.

According to the present invention, the guide bush is movable, and hence it is not necessary to move the head stock. Therefore, any driving mechanism for moving the large head stock is not necessary, and the NC lathe can be compacted.

In the case of a stationary head stock, an accurate positioning of the workpiece is impossible when the workpiece is forwarded in the direction of the spindle axis by a bar feeder or the like. Thus, the positioning tool is disposed on the outlet side of the guide bush, and the workpiece is caused to abut on this positioning tool, whereby the accurate positioning of the workpiece can be achieved.

The invention has a constitution wherein the guide bush is provided with grasp means for grasping a bar, this bar is grasped by this grasp means, and the bar is extended as much as a predetermined length from the spindle.

In the case of the stationary head stock, the workpiece is forwarded in the direction of the spindle axis by a bar feeder or the like. In this case, the positioning of the workpiece is liable to be unstable. Thus, the guide bush is provided with the grasp means for grasping the bar, and the bar is extended from the spindle by this grasp means, whereby the accurate positioning of the workpiece can be achieved.

A method is directed to a method of processing a workpiece by use of a numerically controlled lathe including a head stock which rotatably supports a spindle; a guide bush disposed so as to face this head stock and configured to support one end of the bar-like workpiece extending from the spindle; first and second tool posts which are arranged on both sides of the axis of the spindle and which is movable in the same direction as the spindle axis and a direction crossing the spindle axis at right angles; and tools attached to the first tool post and the second tool post, the method including the steps of disposing the guide bush movably in the same direction as the spindle axis; supporting one end of the workpiece by the guide bush positioned at a predetermined position; processing the workpiece between the guide bush and the spindle by the tool of the first tool post; and processing the workpiece protruding from the guide bush by the tool of the second tool post.

According to this method, both the ends of the workpiece are supported by the spindle and the guide bush, and the processing of the workpiece can be accomplished in a state where the deflection of the workpiece is minimized. Hence, any additional device such as an auxiliary guide is not necessary in addition to the guide bush, and the accurate processing of the bar-like workpiece can be achieved by the NC lathe having a simple constitution.

The invention is concerned with a workpiece processing method in a case where the head stock is fixed to a bed of the numerically controlled lathe, and the method includes the steps of attaching a positioning tool to the second tool post; positioning the guide bush at a predetermined position and positioning the positioning tool at an outlet of the guide bush; forwarding the workpiece from the spindle; and causing the workpiece to abut on the positioning tool, thereby positioning the workpiece.

According to this method, the present invention can be applied to the NC lathe having the stationary head stock. That is, in the NC lathe having the stationary head stock, the positioning of the workpiece is a problem, but the workpiece can be caused to abut on the positioning tool arranged outside the guide bush, whereby the accurate positioning of the workpiece can be achieved.

The invention is directed to a method which includes the steps of processing one end of the workpiece forwarded from the spindle by the tool attached to the first tool post so that the outer diameter of the end of the workpiece becomes equal to the inner diameter of the guide bush; further forwarding the workpiece from the spindle to insert the one end of the workpiece into the guide bush; protruding the workpiece as much as a predetermined length from the outlet of the guide bush to position the workpiece; processing the workpiece by the tool of the first tool post while relatively moving the guide bush with respect to the spindle in the same direction as the spindle axis so that the outer diameter of the workpiece becomes equal to the inner diameter of the guide bush; and processing a portion of the workpiece protruding from the outlet of the guide bush by the tool of the second tool post.

According to this method, even for the workpieces such as drawn works having irregular outer diameters, the portions supported by the guide bush are always finished into uniform outer diameters by the tool, and hence in the second processing region outside the guide bush, the accurate processing is possible.

Effect of the Invention

According to the present invention, a support device such as the auxiliary guide is not necessary, and various processings of the workpieces can be accomplished with a basic constitution including the head stock, the guide bush and the tool post. In particular, the guide bush is attached to the tool post which is movable in the same direction as the spindle axial direction, and hence a mechanism for moving and positioning the guide bush can be utilized together with a driving mechanism for the tool post, whereby the device constitution of the NC lathe can further be simplified.

Moreover, since the guide bush is movable in the same direction as the spindle axial direction, a movement mechanism for the head stock becomes unnecessary, whereby the constitution of the NC lathe can be simplified and compacted, and the saving of its cost can also be achieved.

Furthermore, since the workpiece is processed while both ends of the workpiece are supported by the guide bush and the spindle, the deflection of the workpiece during the processing can be decreased, whereby the accurate processing is possible. Moreover, in contrast to an NC lathe having a support device such as the auxiliary guide, the region capable of processing the workpiece can be enlarged, and a processing time can accordingly be shortened. Furthermore, since the workpieces can simultaneously be processed on both sides of the guide bush, processing steps and the processing time can be curtailed.

BEST MODE FOR CARRYING OUT THE INVENTION

Hereinafter, preferable embodiments of an NC lathe including a guide bush of the present invention and a method of processing a workpiece by use of this NC lathe will be described in detail with reference to the drawings.

[Constitution of NC Lathe]

Figure 1:
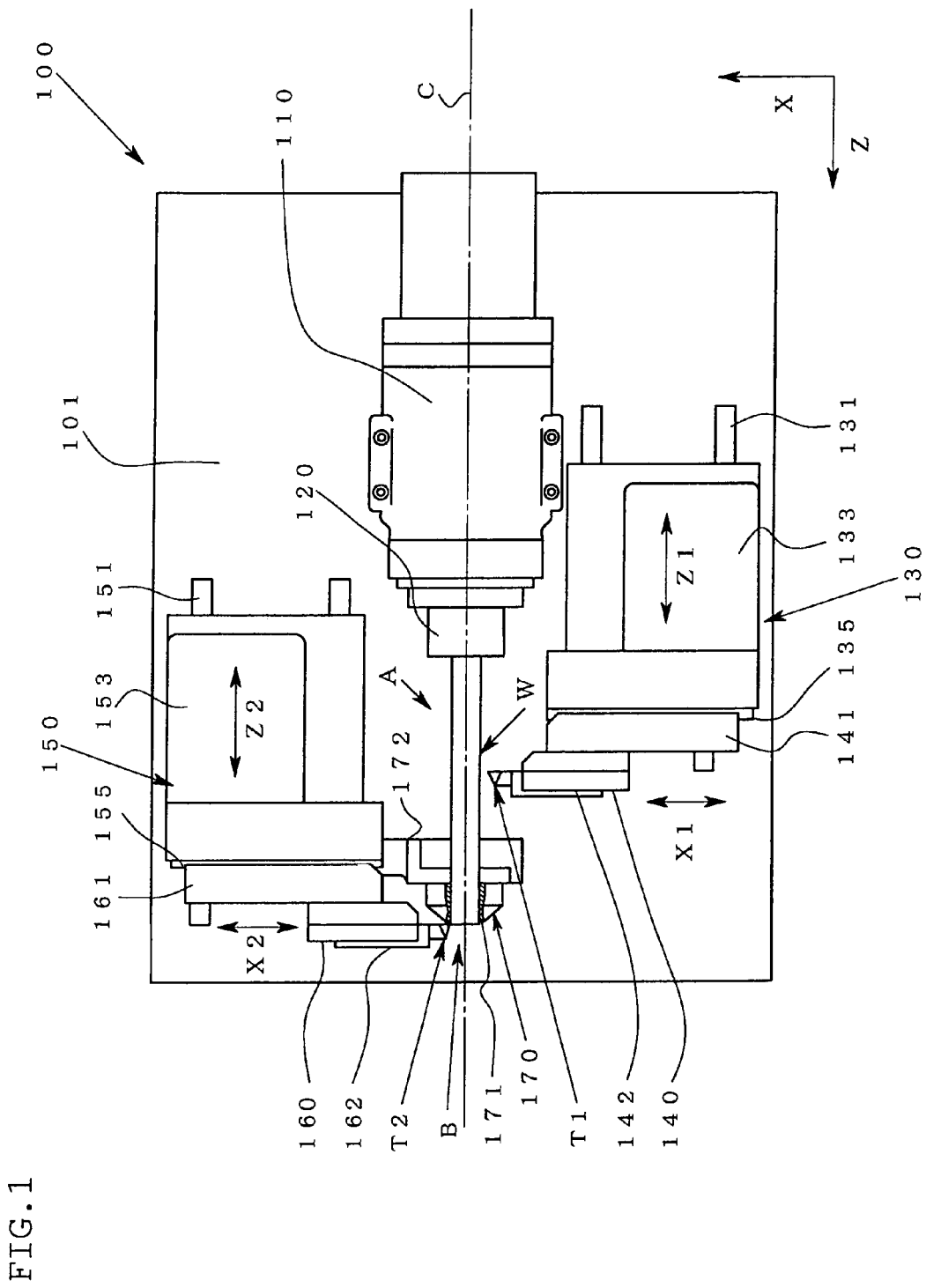
FIG. 1 is a plan view for explaining the schematic constitution of a numerically controlled lathe of the present invention.

FIG. 1 is a plan view for explaining the schematic constitution of an NC lathe of the present invention.

A head stock 110 which rotatably supports a spindle 120 is fixed onto a bed 101 of an NC lathe 100. In the rotation center of the spindle 120, a through hole (not shown) is formed. Moreover, into this through hole, a long-bar-like workpiece W is inserted. The workpiece W is grasped by a chuck (not shown) provided at the tip of the spindle 120.

Figure 8:
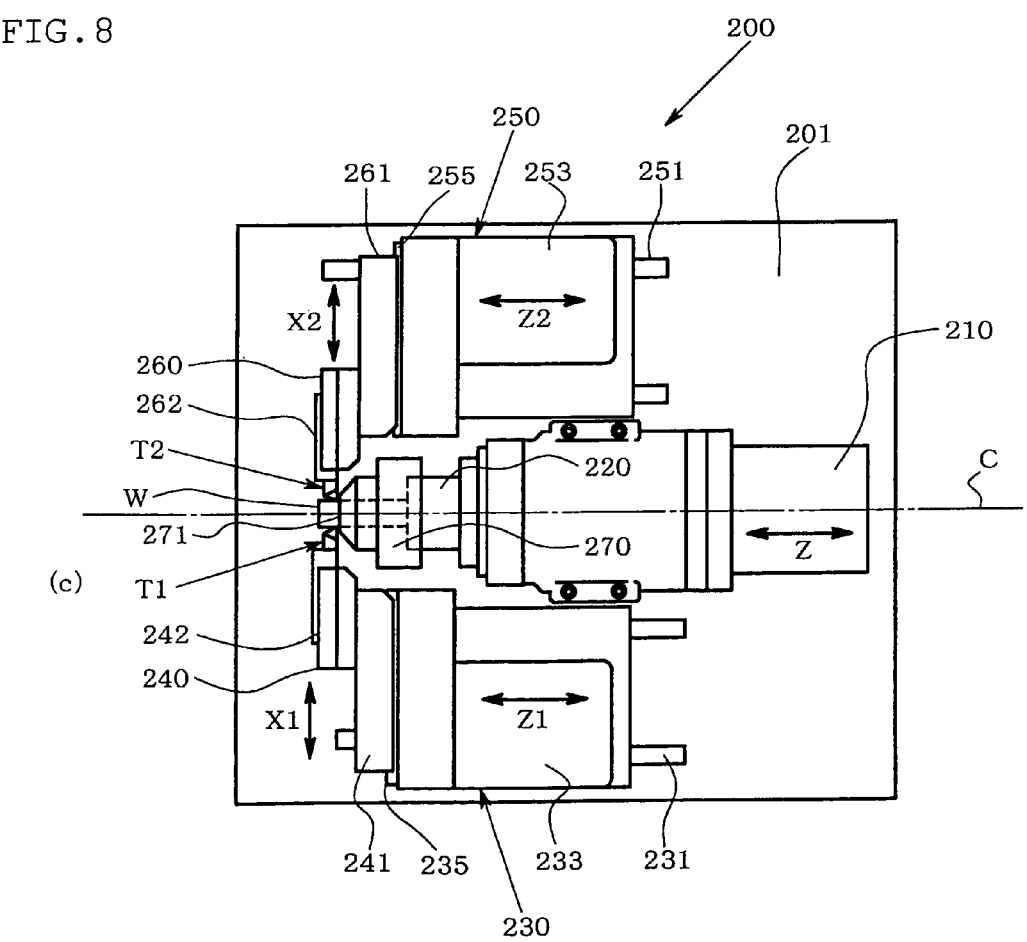
FIG. 8 is a plan view for explaining the schematic constitution of the NC lathe including the guide bush of a conventional example.

On both sides of a spindle axis C, a first tool post 130 and a second tool post 150 are disposed so as to face each other. The basic constitutions of the first tool post 130 and the second tool post 150 are the same as those of the first tool post 230 and the second tool post 250 of the NC lathe 200 shown in FIG. 8.

That is, a tool post main body 133 of the first tool post 130 can move forwards and backwards along a guide rail 131 provided in a Z1-axis direction, and a tool attaching portion 140 provided on one side of the tool post main body 133 can move forwards and backwards along a guide rail 135 together with a slider 141. Moreover, a tool post main body 153 of the second tool post 150 can move forwards and backwards along a guide rail 151 provided in a Z2-axis direction, and a tool attaching portion 160 provided on one side of the tool post main body 153 can move forwards and backwards along a guide rail 155 together with a slider 161.

A plurality of tools T1, T2 are attached in parallel to the tool attaching portions 140, 160 via holders 142, 162. The holders 142, 162 are movable in Y1-axis, Y2-axis directions, and by a combination of the movement of the tool post main bodies 133, 153 in the Z1-axis, Z2-axis directions, the movement of the sliders 141, 161 in the X1-axis, X2-axis directions and the movement of the holders 142, 162 in the Y1-axis, Y2-axis directions, the tools T1, T2 are positioned with respect to the workpiece W.

A guide bush 170 is attached to the tool post main body 153 of the second tool post 150 via an attachment member 172. That is, the guide bush 170 is movable in the Z2-axis direction integrally with the tool T2. The guide rail which guides the movement of the guide bush 170 in the Z2-axis direction is preferably provided right under the guide bush 170 so that the processing accuracy of the workpiece does not lower owing to the deflection of the attachment member 172 due to the weight of the guide bush 170.

Thus, the guide bush 170 can move together with the tool post main body 153 of the second tool post 150, which obviates the need for an independent driving or control mechanism to move the guide bush 170 forwards and backwards, whereby the constitution of the NC lathe can be simplified.

The tools T1, T2 attached to the tool attaching portions 140, 160 are indexed by moving the holders 142, 162 in the Y1-axis, Y2-axis directions. When the spindle 120 is fixed to the bed 101 as in the NC lathe 100 of this embodiment, the workpiece W cannot be positioned by moving the spindle 120. Therefore, a workpiece feeder (not shown) for feeding the workpiece W may be provided with a mechanism for determining the amount of the workpiece W to be forwarded, but in this embodiment, a positioning tool which abuts on the workpiece W forwarded by the above workpiece feeder to stop the workpiece W at a predetermined position is attached to the tool attaching portion 160 of the second tool post 150. This positioning tool will be described later.

Next, a method of processing the workpiece W by use of the NC lathe 100 having the above constitution will be described with reference to FIGS. 1 to 7.

[First Embodiment of Processing Method]

First, a processing method according to a first embodiment of the present invention will be described with reference to FIG. 2.

As shown in FIG. 2(a), while the workpiece W clamped by a chuck 121 provided at the tip of the spindle 120 is released, the bar-like workpiece W is forwarded in the Z-axis direction by the workpiece feeder (not shown) provided behind the head stock 110. The second tool post 150 is moved in the Z2-axis direction in advance to position the guide bush 170 at a predetermined position.

A positioning tool T21 is indexed at a predetermined position by the indexing operation of the tool attaching portion 140. Moreover, the slider 141 is moved in the X2-axis direction to position the positioning tool T21 in the vicinity of an outlet 171 of the guide bush 170. The tip of the workpiece W forwarded in the Z-axis direction by the workpiece feeder is inserted into a guide hole 172 of the guide bush 170, and abuts on the positioning tool T21 in the vicinity of the outlet 171. In consequence, the forwarding of the workpiece W is stopped. Moreover, the chuck 121 clamps and fixes the workpiece W. Consequently, the workpiece W is positioned.

The first tool post 130 indexes a lathing tool T11 at a predetermined position by the indexing operation of the tool attaching portion 160 in the Y1-axis direction. Then, as shown in FIG. 2(b), the tool T11 of the first tool post 130 processes the outer periphery of the workpiece W in a first processing region A between the guide bush 170 and the spindle 120.

When various kinds of processings are given to the workpiece W, the processings are successively given thereto while the tool attached to the tool attaching portion 160 is appropriately indexed.

When the predetermined processings have been completed, the tool post 130 is moved to the vicinity of the spindle 120, and the tool T11 is then replaced with a cutting-off tool T13 to cut off the workpiece W in the vicinity of the spindle 120, as shown in FIG. 2(c).

After cutting off the workpiece W by the tool T13 in the vicinity of the spindle 120, a pin-like knockout tool T3 is brought into contact with the tip of the workpiece W so as to prevent the workpiece W from moving in the Z-axis direction. This knockout tool T3 can be attached to a tail stock or the like (not shown) which is movable in the Z-axis direction.

Then, as shown in FIG. 2(d), while the movement of the workpiece W in the Z-axis direction is regulated by the knockout tool T3, the second tool post 150 is moved in the Z2-axis direction, and the guide bush 170 is detached from the workpiece W. In consequence, a formed article Wa is discharged from the first processing region A.

[Second Embodiment of Processing Method]

Next, a second embodiment of the processing method of the present invention will be described with reference to FIG. 3.

The forwarding of the workpiece W by the workpiece feeder, the positioning of the workpiece W and the processing of the workpiece W by the tool T11 in the first processing region A are similar to those in FIGS. 2(a) and 2(b), and hence the detailed description thereof is omitted herein.

When the predetermined processing of the workpiece W in the first processing region A shown in FIG. 3(a) is completed, as shown in FIG. 3(b), both ends of the workpiece W are cut off in the vicinity of the spindle 120 and in the vicinity of the guide bush 170.

Specifically, the lathing tool T11 is replaced with a cutting-off tool T12 to cut off the workpiece W in the vicinity of the guide bush 170. Afterward, the tool post 130 is moved to the vicinity of the spindle 120, and the tool T12 is replaced with the cutting-off tool T13 to cut off the workpiece W in the vicinity of the spindle 120. In consequence, the formed article Wa is discharged from the first processing region A.

At this time, a part of the tip of the workpiece W remains in a guide hole 172 of the guide bush 170 (as shown by Wb in FIG. 3(c)), but the remaining portion Wb can be extruded from the guide hole 172 by the workpiece W newly forwarded in the Z-axis direction by the workpiece feeder.

In this embodiment, the tool T21 for positioning the workpiece W forwarded in the Z-axis direction by the workpiece feeder is beforehand positioned in a position where the tool does not interfere with the remaining portion Wb of the workpiece W extruded from the guide hole 172.

[Third Embodiment of Processing Method]

Figure 2:
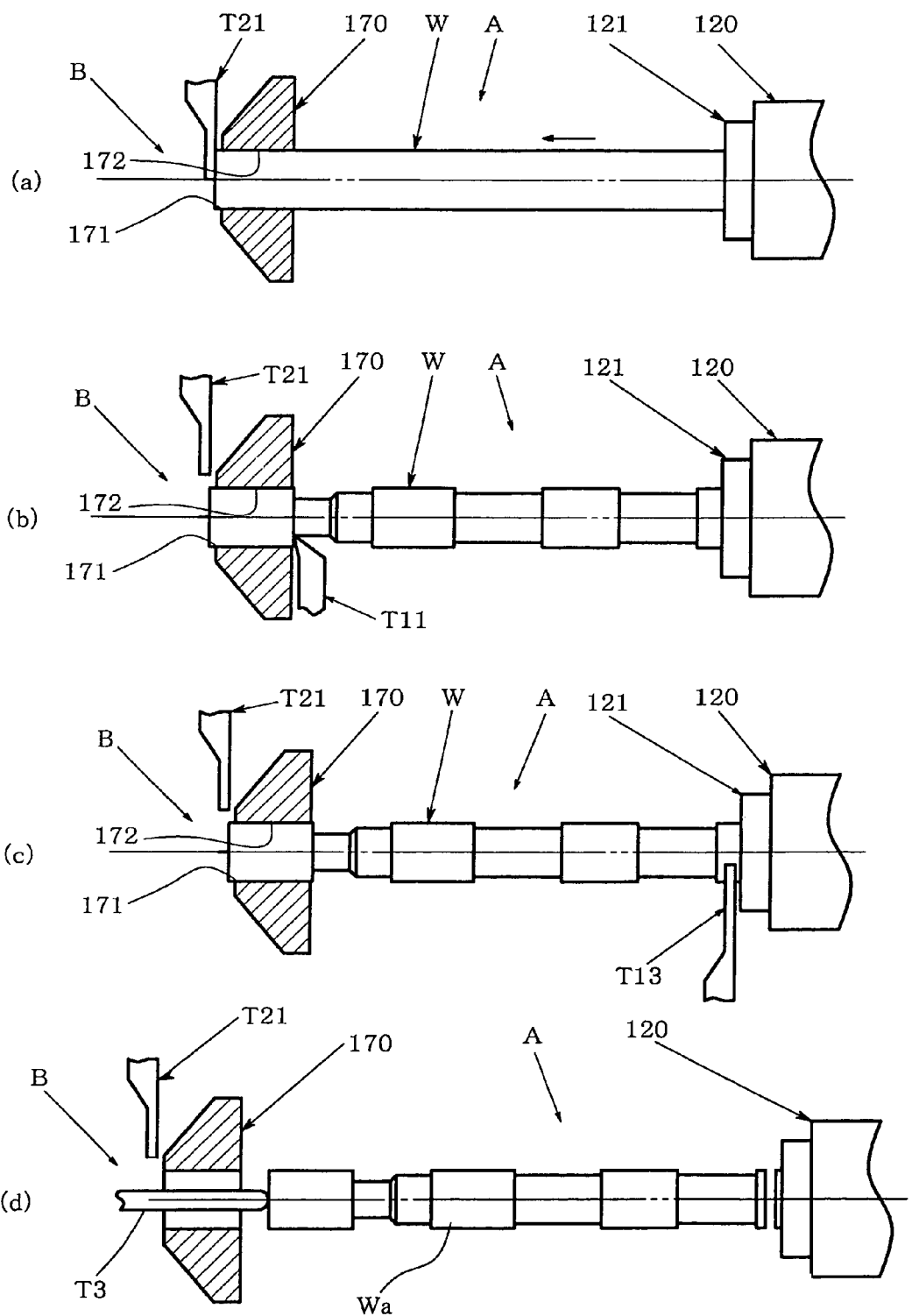
FIG. 2 is a schematic diagram for explaining a first embodiment of a processing method using the numerically controlled lathe of FIG. 1.
Figure 3:
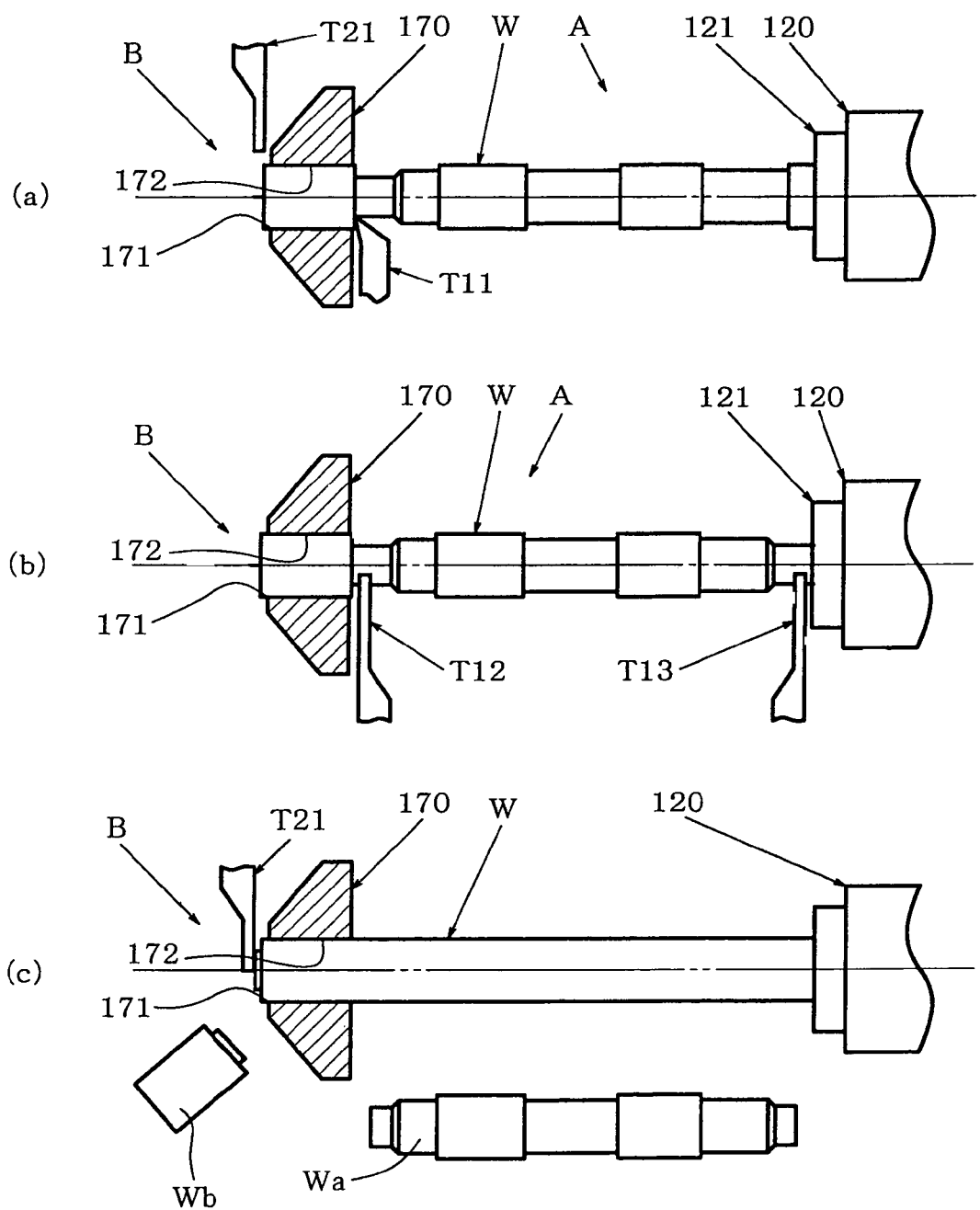
FIG. 3 is a schematic diagram for explaining a second embodiment of the processing method of the present invention.

In the method of processing the workpiece W as shown in FIGS. 2 and 3, the workpiece W is processed in the first processing region A between the guide bush 170 and the spindle 120. In the processing method shown in FIGS. 4 and 5, the workpiece W is processed simultaneously in the first processing region A provided on the side of the head stock of the guide bush 170 and a second processing region B provided on the side of the guide bush 170 opposite to the head stock.

Figure 4:
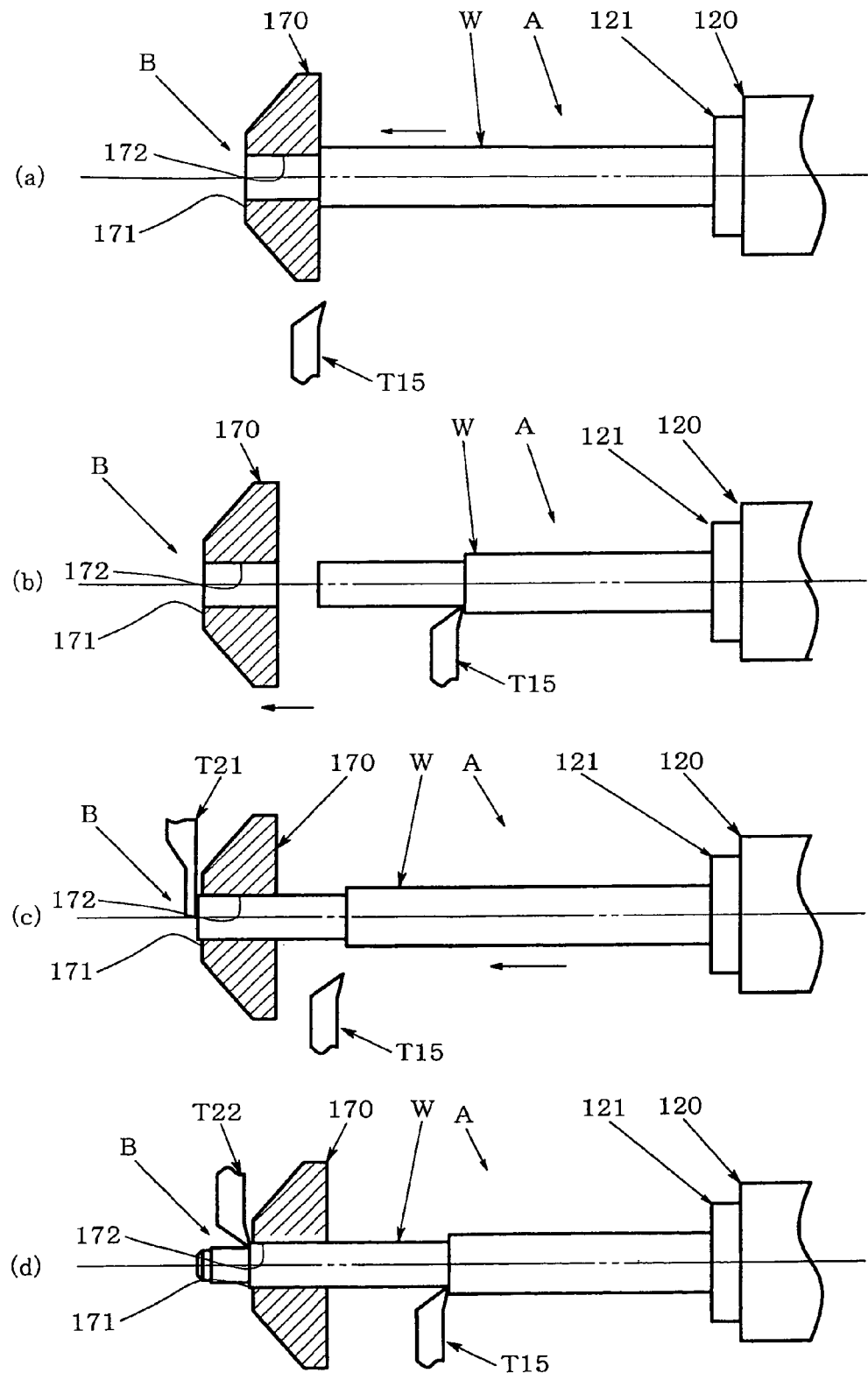
FIG. 4 is a schematic diagram for explaining a third embodiment of the processing method of the present invention.

Hereinafter, the processing method according to a third embodiment will be described with reference to FIGS. 4 and 5.

As shown in FIG. 4(a), the guide hole 172 of the guide bush 170 is formed into a size smaller than the outer diameter (the material diameter) of the workpiece W. The guide bush 170 is positioned at a predetermined position by the movement of the second tool post 150, and the workpiece feeder is driven to forward the workpiece W in the Z-axis direction while the chuck 121 of the spindle 120 is opened.

The workpiece W is positioned, when the tip of the workpiece abuts on the guide bush 170.

The workpiece W is grasped and fixed by the chuck 121 of the spindle 120.

Next, as shown in FIG. 4(b), the guide bush 170 is moved in the Z-axis direction and moved away from the tip of the workpiece W. In consequence, the tip of the workpiece W is positioned in the first processing region A.

It is to be noted that to position the tip of the workpiece W in the first processing region A, the above guide bush 170 is not used, but the amount of the workpiece W to be forwarded by the workpiece feeder may be regulated.

Next, as shown in FIG. 4(b), the workpiece W is cut by a tool T15 of the first tool post 130 so that the outer diameter of the workpiece matches the hole diameter of the guide bush 172 of the guide bush 170. After the workpiece W is cut as much as a predetermined length from the tip of the workpiece by the tool T15, as shown in FIG. 4(c), the tool T15 is moved away from the workpiece W, and the workpiece W grasped by the chuck 121 is released, whereby the workpiece W is forwarded in the Z-axis direction by the workpiece feeder. It is to be noted that at this time, the positioning tool T21 is beforehand positioned on the side of the outlet 171 of the guide bush 170.

The tip of the workpiece W is processed in accordance with the hole diameter of the guide hole 172. Therefore, the workpiece W is forwarded in the Z-axis direction to guide the tip of the workpiece W into the guide hole 172, and the workpiece W abuts on the positioning tool T21 at the outlet 171, thereby positioning the workpiece.

As shown in FIG. 4(d), the tool of the tool attaching portion 160 of the second tool post 150 is changed from the positioning tool 21 to a cutting tool T22. Then, the processing of the workpiece W in the second processing region B on the side of the guide bush 170 opposite to the head stock is performed by the tool T22 of the second tool post 150. Simultaneously with this processing, the workpiece W is processed so as to adjust the outer diameter of the workpiece in accordance with the hole diameter of The guide hole 172, by the tool T15 of the first tool post 130 in the first processing region A between the spindle 120 and the guide bush 170.

As shown in FIG. 5(a), the processing of the workpiece W by the tool T22 of the second tool post 150 is performed while forwarding the guide bush 170 together with the second tool post 150 toward the spindle 120. When the guide bush 170 is moved in the Z-axis direction, the tool T15 of the first tool post 130 cuts the outer diameter of the workpiece W.

Therefore, even when the workpiece W has a non-uniform outer diameter dimension as in a drawing material, a portion of the workpiece supported by the guide bush 170 is usually finished into a uniform outer diameter dimension by the tool T15, whereby there is an advantage that the processing can be performed with high accuracy by the tool T22 in the second processing region B outside the guide bush 170.

When the processing of the workpiece W in the second processing region B is completed, the tool T22 is replaced with a cutting-off tool T23 to cut off the tip portion of the workpiece W, and the tip portion is discharged from the second processing region B. To cut off the tip portion of the workpiece W, the tool T15 of the first tool post 130 is retreated to a position where the tool does not interfere with the guide bush 170.

Figure 5:
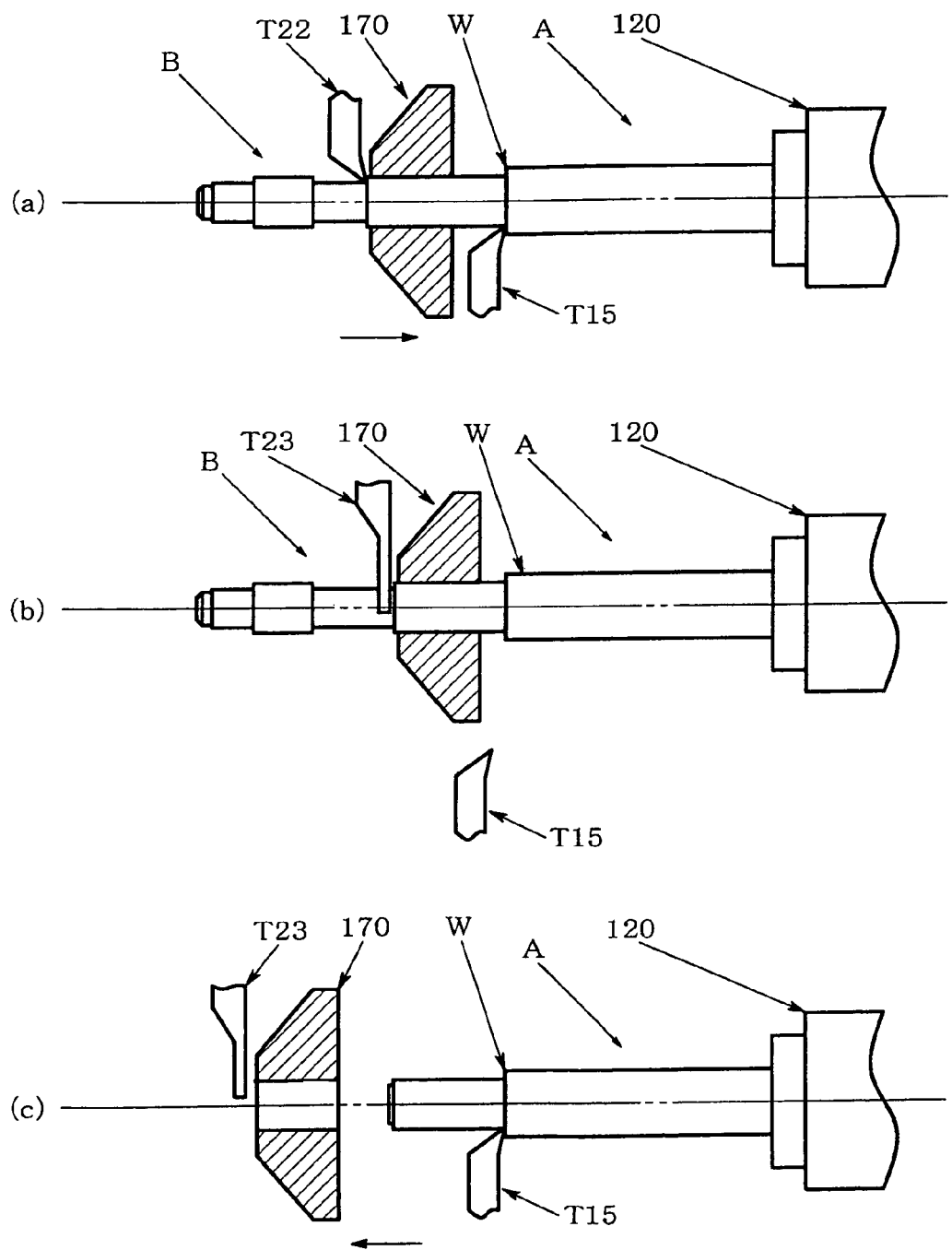
FIG. 5 is a schematic diagram for explaining the third embodiment of the processing method of the present invention, and shows steps subsequent to those of FIG. 4.

After cutting off the tip portion of the workpiece W, as shown in FIG. 5(c), the guide bush 170 is moved in the Z-axis direction and the tip of the workpiece W is detached from the guide bush 170. Then, the processing of the workpiece W is continued so as to adjust the outer diameter of the workpiece by the tool T15. Afterward, the operation of FIGS. 4(b) to 5(c) is repeated.

It is to be noted that in this embodiment, the positioning tool T21 and the cutting-off tool T23 are described as separate tools, but the positioning tool T21 may be identical to the cutting-off tool T23. That is, the cutting-off tool T23 can be used as the positioning tool. This obviates the need for an indexing operation from the positioning tool T21 to the cutting-off tool T23, and there is another advantage that the type of the tool to be attached to the tool attaching portion 160 can be increased.

The tool T2 attached to the tool attaching portion 160 is not limited to the clotting tool, and a rotary tool such as a drill may be used.

Figure 6:
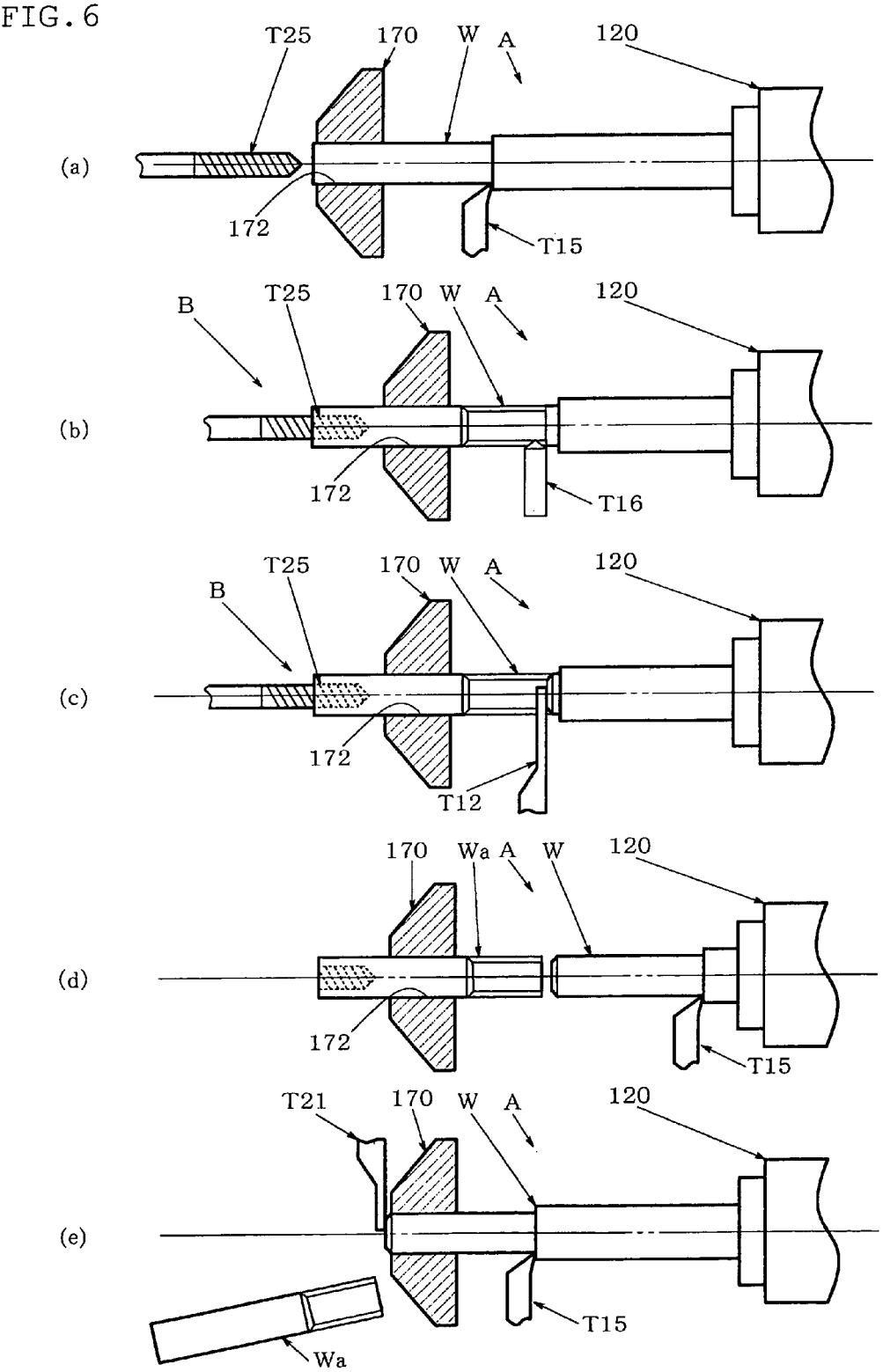
FIG. 6 is a schematic diagram for explaining a fourth embodiment of the processing method of the present invention.

There will be described an example of the processing method in which a rotary tool T25 is attached to the tool attaching portion 160 to process the workpiece W, with reference to FIG. 6.

This example is the same as FIGS. 4(a), (b) and (c) described above in that the tip of the workpiece W is positioned in the first processing region A for positioning and processing the workpiece W so as to adjust the outer diameter of the workpiece W, and hence the description thereof is omitted herein.

As shown in FIG. 6(a), the rotary tool T25, for example, the drill or the like is positioned so as to face the end face of the workpiece W. In the first processing region A, the lathing of the workpiece W is performed by the tool T15 of the first tool post 150, so as to set the outer diameter of the workpiece W to a dimension equal to the inner diameter of the guide hole 172 of the guide bush 170.

Then, as shown in FIG. 6(b), the end face of the workpiece W is subjected to hole making processing by the rotary tool T25, while moving the rotary tool T25 and the guide bush 170 together with the second tool post 150 in the Z-axis direction. On the other hand, in the first processing region A, the outer peripheral surface of the workpiece W is subjected to screw-thread cutting by a tool T16 such as a screw-thread cutting tool. These two types of processings are simultaneously performed.

When the above processing is completed, as shown in FIG. 6(c), the workpiece W is cut off by the tool T12, for example, a cutting-off tool or the like. As to the workpiece W grasped by the spindle 120, the lathing of the workpiece is performed by the tool T15, so as to set the outer diameter of the workpiece W to the dimension equal to the inner diameter of the guide hole 172 of the guide bush 170. When the lathing is completed to obtain the workpiece having a predetermined length, the workpiece W grasped by the chuck 121 is released, and as shown in FIG. 6(d), the workpiece feeder is driven to forward the workpiece W in the Z-axis direction. In consequence, the formed article Wa is pushed by the workpiece W, detached from the guide bush 170, and discharged from the second processing region B as shown in FIG. 6(e).

The embodiment is the same as the above embodiments in that the positioning tool T21 is beforehand positioned in the position where the tool does not interfere with the formed article Wa, and the workpiece W is caused to abut on the tool T21, and positioned after discharging the formed article Wa.

The NC lathe of the present invention can perform the processing similar to that of a usual. NC lathe having the guide bush.

Figure 7:
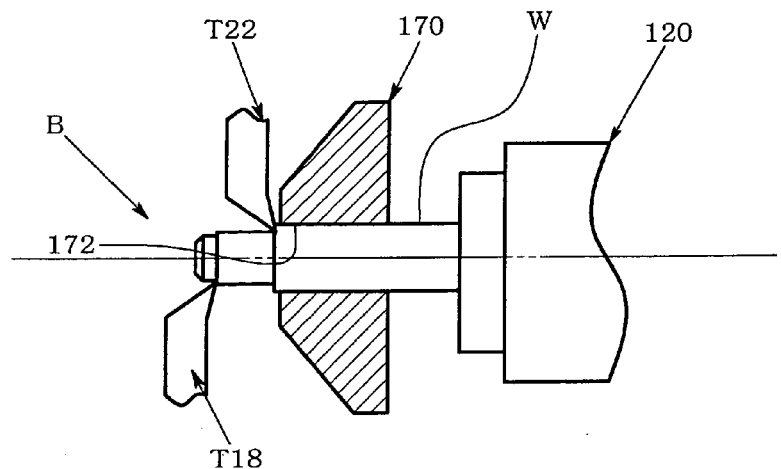
FIG. 7 is a schematic diagram showing a processing example in which an NC lathe 1 of the present invention is used in the processing of a workpiece which is performed in a usual NC lathe having a guide bush.

FIG. 7 is a diagram showing a processing example in which the NC lathe 100 of the present invention is used in the processing of the workpiece performed by the usual NC lathe having the guide bush. In the processing shown in FIG. 7, the workpiece W is protruded as much as an appropriate length from the guide hole 172 of the guide bush 170, and a tool T18 of the first tool post 130 and the tool T22 of the second tool post 150 are positioned, respectively, in the second processing region B on the side of the guide bush 170 opposite to the head stock, whereby the lathing of the workpiece W is performed by these two tools T18, T22 in the vicinity of the guide bush 170.

The preferable embodiments of the present invention have been described, but the present invention is not limited to the above embodiments.

For example, it has been described that when the head stock 110 is fixed to the bed 101 of the NC lathe 100, the workpiece W is forwarded in the Z-axis direction by the workpiece feeder, but the forwarding of the workpiece W is not limited to this example. For example, the guide bush 170 may be provided with grasp means for grasping the workpiece W, and the workpiece W is grasped by this grasp means, whereby the workpiece may be extended as much as a predetermined length from the spindle 120 while moving the guide bush 170 in the Z2-axis direction.

INDUSTRIAL APPLICABILITY

The present invention is not limited to a numerically controlled lathe having comb-teeth-like tool attaching portions, and is applicable even to a numerically controlled lathe having a turret-like tool attaching portion for indexing a tool at a predetermined position by an indexing rotation operation. Moreover, the present invention is not limited to a stational head stock, and can be applied even to an NC lathe in which a head stock is movable in a Z-axis direction.

The invention claimed is:

1. A numerically controlled lathe, comprising:
   a spindle;
   a guide bush having a guide hole thereon and supporting an end portion of a workpiece extending from the spindle;
   a first tool post having a first tool machining the workpiece; and
   a second tool post having a second tool machining the workpiece,
   wherein an inner diameter of the guide hole is smaller than an outer diameter of the workpiece,
   the first tool post is disposed to machine the workpiece between the guide bush and the spindle by the first tool so that the outer diameter of the workpiece fits to the inner diameter of the guide hole,
   the guide bush is disposed to pass the workpiece machined by the first tool through the guide hole so that the end portion of the workpiece machined by the first tool projects from the guide bush, and
   the second tool post is disposed to machine the end portion of the workpiece projecting from the guide bush by the second tool.

2. The numerically controlled lathe according to claim 1, wherein the first tool post and the second tool post are disposed on both sides of a spindle axis and facing to each other over the spindle axis.

3. The numerically controlled lathe according to claim 1, wherein the second tool post is movable in a same direction as a spindle axis, and
   the guide bush is attached to the second tool post.

4. The numerically controlled lathe according to claim 1, further comprising
   a bed of the lathe;
   a spindle base rotatably supporting the spindle, fixed to the bed of the lathe; and
   a positioning tool attached to the second tool post, configured to position the workpiece at a predetermined position,
   wherein the positioning tool abuts with the workpiece projecting from the guide bush to position the workpiece at the predetermined position.

5. The numerically controlled lathe according to claim 1, further comprising a holding member holding the workpiece, present on the guide bush,
   wherein the guide bush is movable in a same direction as a spindle axis, and
   the guide bush moves in the same direction as the spindle axis and pulls the workpiece by a predetermined length from the spindle while holding the workpiece with the holding member.

6. A method of processing a workpiece with a numerically controlled lathe including a guide bush supporting an end portion of the workpiece extending from a spindle and machining the workpiece between the spindle and the guide bush while supporting the workpiece with the guide bush, the method comprising:
   preparing a first tool post having a first tool machining the workpiece between the guide bush and the spindle, and a second tool post having a second tool machining the end portion of the workpiece projecting from the guide bush;
   machining the workpiece between the guide bush and the spindle by the first tool to form an outer diameter of the workpiece fitting into an inner diameter of a guide hole of the guide bush;
   passing the workpiece machined by the first tool through the guide bush to hold the workpiece with the guide bush; and
   machining the end portion of the workpiece projecting from the guide bush by the second tool.

7. The method according to claim 6, wherein the machining of the end portion of the workpiece by the second tool and the machining of the workpiece to form the outer diameter of the workpiece fitting into the inner diameter of the guide hole by the first tool are performed simultaneously.

8. The method according to claim 6, wherein, in case a spindle base rotatably supporting the spindle is fixed to a bed of the lathe, the method further comprising
   attaching a positioning tool to the second tool post;
   positioning the guide bush at a predetermined position and positioning the positioning tool at an outlet of the guide bush;
   forwarding the workpiece from the spindle; and
   abutting the workpiece on the positioning tool, thereby positioning the workpiece at a prescribed position.

9. The numerically controlled lathe according to claim 1, wherein
   the first tool post is present in a first processing region,
   the second tool post is present in a second processing region, and
   the guide bush separates the first processing region and the second processing region with respect to the guide bush.

* * * * *